Feb. 16, 1932.　　　　A. BURGER　　　　1,845,124

THERMOMETER

Filed Oct. 12, 1929

INVENTOR:
Alfred Burger

Patented Feb. 16, 1932

1,845,124

UNITED STATES PATENT OFFICE

ALFRED BURGER, OF ROCHESTER, NEW YORK, ASSIGNOR TO TAYLOR INSTRUMENT COMPANIES, OF ROCHESTER, NEW YORK, A CORPORATION OF NEW YORK

THERMOMETER

Application filed October 12, 1929. Serial No. 399,244.

This invention relates to thermometers and has for its object means for magnifying the bore and more in particular the mercury thread.

Heretofore it was the general practice to lens the stem i. e. to provide a lens front to obtain the magnification.

In order to obtain a relatively large magnification, the lens front must form a very acute angle with the disadvantage that the field is very small, i. e. the mercury thread can be seen only in a definite small range of positions of the eye relatively to the lens front.

Another difficulty militating against easy observation of the mercury thread is presented by the reflection of the light rays from the mercury as also from the walls of the bore above the mercury. Since the medium within the bore above the mercury is less dense than glass, many of the light rays incident upon the bore are totally reflected into the eye of the observer and thus materially impair the observation of the thread.

It is a particular object of the invention to provide a magnifying arrangement avoiding the above mentioned difficulties.

Briefly expressed, the invention comprises a magnifying lens within the body of the stem.

For a full understanding of the invention, the principle upon which it is based, its preferred execution and its advantages, reference is made to the accompanying drawings wherein Fig. 1 is a front elevation of a thermometer embodying the invention;

Figure 1:
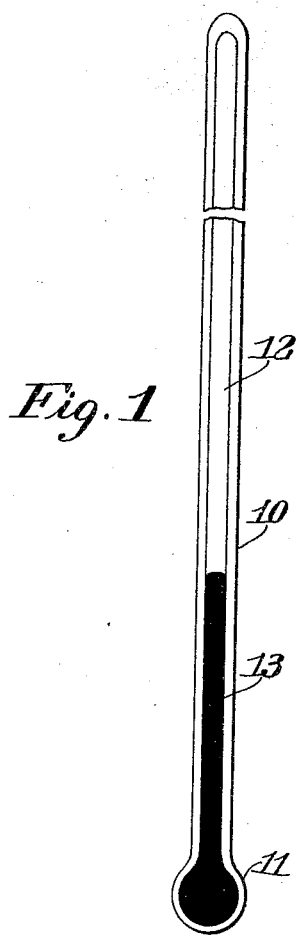

In Fig. 1, 10 is the stem of a glass thermometer and 11 is the usual bulb connected thereto. As indicated, the bore 12 and the mercury column 13 therein appear very wide relatively to the stem, the apparent width being due to magnifying action obtained by the invention to be more fully described.

Figure 2:
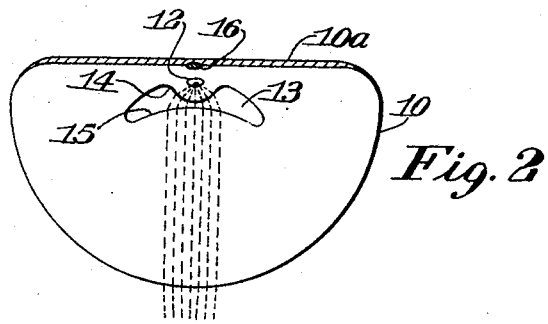
Fig. 2 is a cross-section thereof, on a larger scale, to more clearly show the characteristic aspect of the invention.

Having reference to Fig. 2, the stem 10 is substantially semi-circular in cross-section and the flat side thereof is preferably provided with a coat 10a of white enamel furnishing a light background. The capillary bore 12 is disposed in close proximity to the flat side and is preferably oval. In front of the bore 12 and symmetrically in respect to the center plane through the bore of the stem is disposed the relatively large channel 13. This channel which constitutes the invention proper, defines two convex glass surfaces 14 and 15 opposing each other to form a collecting lens unit. As roughly indicated by the dotted lines, the rays of light emanating from the capillary bore in a forward direction, are all collected and refracted toward the medium plane, with the result that the image of the bore or the mercury column is correspondingly magnified.

The degree of magnification, of course, depends upon the size of the lens surfaces and the radii of curvature thereof and the different factors entering into the question of magnification, including the front surface of the stem, may be correlated in various ways to bring about the desired optical effect.

The arrangement described has the advantage that substantially all rays emanating from the bore within an angle of about 180° are collected and made useful for the visualization of the mercury column. In addition, light rays entering the stem cannot fall directly upon the bore or be reflected directly from the bore into the eye of the observer. These rays, which heretofore constituted a great obstacle to a clear observation of the mercury column, are now practically eliminated as a source of trouble. The mercury column is principally visible as a dark object against a light background. In order to still more accentuate the idex position of the mercury column, a colored, preferably red stripe 16 may be placed to the rear of the bore so as to be visually coextensive therewith.

Figure 3:
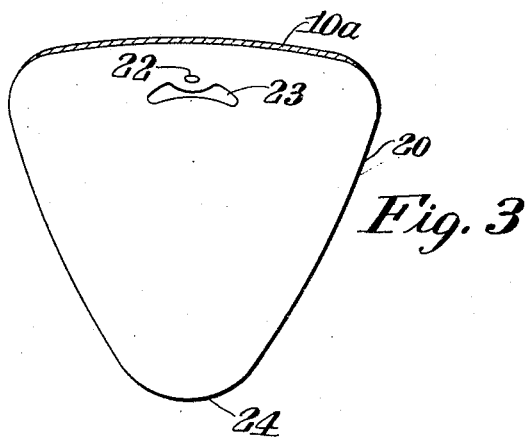
Fig. 3 is a cross-section of a slightly modified form of the arrangement shown in Fig. 2.

In Fig. 3, the bore 22, the channel 23 and their correlation are substantially the same as described in connection with Fig. 2. However, the stem 20 has also a lens surface 24 which, although not as sharply defined as the usual lens front, has nevertheless a distinct magnifying action in addition to the action of the lens surfaces of the opening 23.

Figure 4:
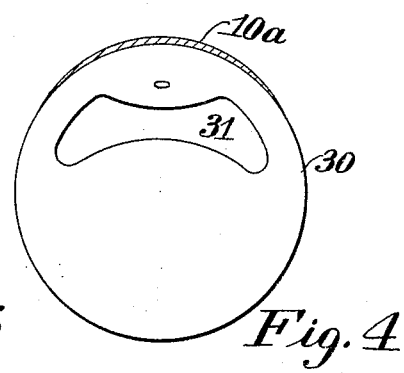
Fig. 4 is a cross-section of another form.

In Fig. 4, the stem 30 is of the round form generally used before the lens front was known. The channel 31 is indicated as very much larger than in the forms above described. The size of the channel has no special relation to the particular form of the stem, but may be chosen, as in all other forms, to produce in conjunction with other factors affecting the degree of magnification, the desired effect.

Figure 5:
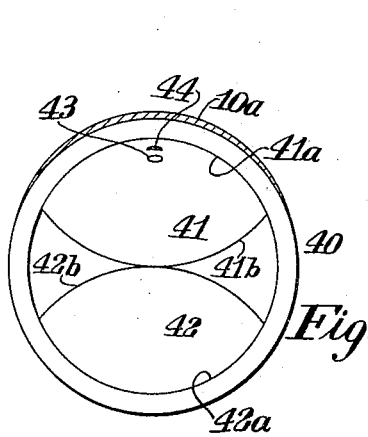
Fig. 5 is a cross-section of still another embodiment.

In Fig. 5 is shown a form composed of three parts separately manufactured and subsequently united. The tubular part 40 resembles the usual form of boiler gauge tube, although proportionately smaller in cross-section, and may be provided with the enamel coating 10a. Within the tube 40 are disposed two glass rods 41 and 42 having curved surfaces 41a and 42a, respectively, approximately fitting the wall of the inner wall of the tube and lenticular surfaces 41b and 42b, respectively, facing each other to form the magnifying system. The rod element 41 is provided with the capillary bore 43 and, if desired, may also be provided with a colored stripe 44.

While the construction just described is composed of a plurality of parts, it is cheaply produced and readily assembled. The lenticular surfaces may touch or may be separated. The stem 41 to which the bulb must be connected, may be manufactured in the usual way, aside from the peculiar shape of the stem and the parts may be readily united by cement or the like. The top and bottom of the tube 40 may be closed to exclude dirt, etc.

This form of device has the advantage that the scale which may be provided on the part 41, is then fully enclosed within the tube 40, similar to the so-called sanitary thermometers in which the thermometer proper is surrounded by a separate tube.

While the rods are shown to substantially fit the inner wall of the tube 40, such a fit is not all essential. There is a great deal of latitude in regard to the structural detail of this form of the invention.

Although this invention is primarily intended for application in thermometers, it is not limited thereto.

I claim:

1. In devices of the character described, a glass stem having a bore and a channel coextensive in length with the bore, opposing faces of said channel being shaped to define a lens unit for visually magnifying the bore.

2. In a thermometer, a glass stem having a capillary bore and a channel coextensive in length with the bore, opposing faces of said channel being shaped to define a lens unit for visually magnifying the bore.

3. In a thermometer, a glass stem having a capillary bore and a channel coextensive in length with the bore, said channel being defined by opposing convex walls for visually magnifying the bore.

In testimony whereof I affix my signature.

ALFRED BURGER.